July 2, 1963
M. A. MAY
3,095,603
SAUSAGE SLITTING HAND TOOL
Original Filed Sept. 4, 1959
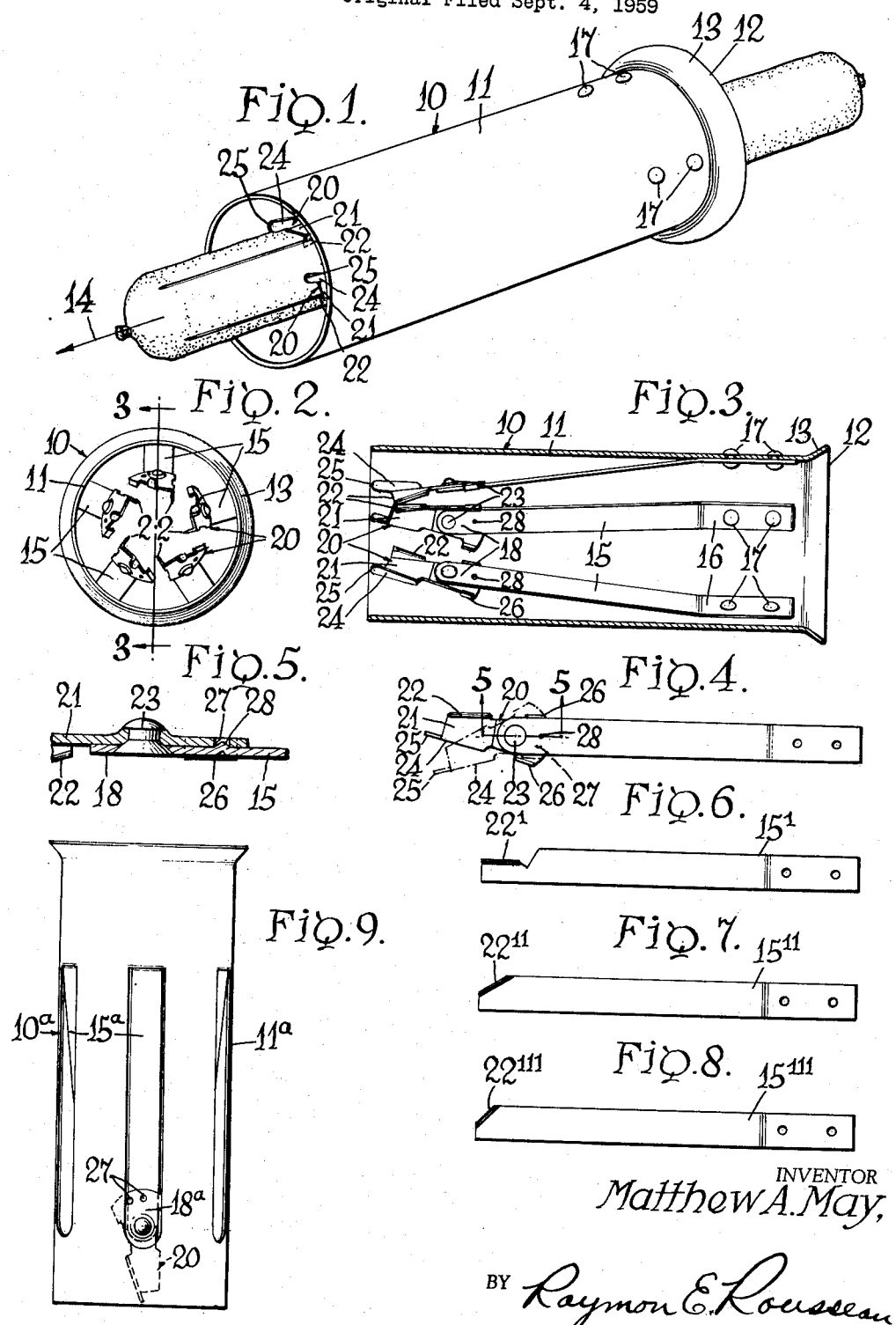
INVENTOR
Matthew A. May,
BY Raymon E. Rousseau
ATTORNEY

United States Patent Office 3,095,603
Patented July 2, 1963

3,095,603
SAUSAGE SLITTING HAND TOOL
Matthew A. May, 287 Union Road, West Seneca, N.Y.
Continuation of application Ser. No. 838,318, Sept. 4, 1959. This application Mar. 5, 1962, Ser. No. 177,940
5 Claims. (Cl. 17—25)

This application is a continuation of my application Serial Number 838,318, now abandoned.

This invention relates to a hand tool for forming a number of spaced relatively shallow parallel slits along the length of and to a predetermined depth in sausages. The advantages of such slits are that the sausages will not burst when they are cooked and thereby will present a more pleasing and appetizing appearance as compared with sausages having uninterrupted skins, the slits providing adequate vents for the escape of the vapors produced by cooking.

One object of the invention is to provide a simple, effective and safe sausage slitting hand tool which can be manufactured and sold at a low cost.

Another object is to provide a sausage slitting hand tool which can be readily cleaned after its use.

Another object is to provide a hand tool which will accommodate sausages of various diameters and length.

Another object is to provide a hand tool wherein the slit forming cutters are located to avoid injury to the user.

Another object is to provide a hand tool wherein the slit forming cutters may be formed and located to provide straight or spirally arranged slits according to individual preference.

The hand tool of the invention is characterized by an open-ended cylindrical body through which the sausage may be moved manually and freely in substantially coaxial relation and by a plurality of flat spring arms having equally spaced end portions rigidly secured to the body adjacent the end into which the sausage is inserted, the arms extending inward and downward from their points of attachment and at their free ends being severally provided with inwardly projecting cutter blades having inclined cutting edges which will cut the skin of the sausage and penetrate the meat to a predetermined depth as the sausage is moved through the body, the result of such movement being the formation of the slits through which the vapors escape as the sausage is cooked.

In the drawings:

FIGURE 1 is a perspective view of a sausage slitting hand tool wherein the slit forming cutters are selectively positionable to provide a number of equally spaced straight or spirally arranged slits.

FIGURE 2 is an elevational view of the discharge end of the tool shown in FIGURE 1.

FIGURE 3 is a longitudinal sectional view taken on the line 3—3 of FIGURE 2.

FIGURE 4 is a bottom plan view of one of the spring arms with the cutter blade positioned for a straight slit and showing in dot and dash lines the cutter blade positioned for a spiral slit.

FIGURE 5 is an enlarged fragmentary detail sectional view on the line 5—5 of FIGURE 4 and shows the pivotal mounting of the cutter body and a detent means for holding the cutter body in a selected position.

FIGURES 6, 7 and 8 are bottom plan views of different forms of combined arms and cutters respectively formed to provide straight, long spiral and close spiral slits.

FIGURE 9 is a longitudinal sectional view of a modified form of tool wherein the cutter carrying arms are integral with the tool body.

Referring to FIGURES 1 to 5:

The sausage slitting hand tool 10 includes a tubular body 11 of circular cross-section. The body 11 has a diameter somewhat greater than the diameter of the largest of the sausages with which the tool is to be used and has an entrance end 12 preferably formed with a flared mouth 13 which facilitates the insertion of a sausage into the body 11.

As shown in FIGURE 3, the body 11 carries a plurality of internally located spring arms, preferably in the form of flat leaf springs 15, each having one of its ends 16 secured within the body 11 inwardly of its entrance end 12 in any suitable manner, for example, by the rivets 17. The arms 15 extend toward the opposite end of the body 11 and are each inclined inward, their free ends 18 terminating short of the discharge end of the body 11. As shown in FIGURE 2 the arms 15 are radially disposed and equally spaced. Due to their length and inward inclination their free ends 18 resiliently engage and center the sausage to be slit.

The free end portion 18 of each arm carries a sausage slitting cutter means 20 having an inwardly directed knife 22 having a downwardly inclined cutting edge and which, as the sausage is moved through the body 11, cuts its skin and penetrates the meat to the predetermined extent, the portion 18 of the arm resting upon the surface of the sausage.

In the construction shown in FIGURES 1 to 5 each cutter means 20 includes a plate 21 which is formed with an inwardly projecting knife 22 along one of its sides and is pivotally secured upon the portion 18 by a rivet 23 with the knife 22 located forward of the portion 18 and projecting inward. The knife 22 is formed with a forwardly and downwardly inclined cutting edge and as the sausage is moved through the body 11 the knife 22 slits the skin and penetrates the meat as above explained. The knife 22 operates with a shearing action which prevents tearing the sausage. The opposite side of the plate 21 may be reinforced by an oppositely extending flange 24 which has its forward end formed to provide a finger piece 25 by means of which the plate 21 may be swung and its knife 22 selectively located either parallel to the arm 15 to provide a straight lengthwise slit or at an angle thereto to provide a spiral slit.

The plate 21 is formed with a pair of ears 26, each to abut an adjacent side of the arms 15 to limit the swinging movement of the plate about the rivet 23. The plate 21 is also formed with a pair of holes 27 (FIGURES 4 and 5) each engageable with a detent 28 on the arm 15 to hold it in its selected position.

The form of tool above described enables selection as to the form of the slits. A non-selective form in which the slitting knives are integral with the spring arms may be manufactured with greater economy. Examples of such a form are shown in FIGURES 6 to 9. As shown in FIGURE 6 the knife 22' is integral with and parallel to its arm 15' to provide a straight slit. In FIGURE 7 the knife 22" is integral with and angularly related to its arm 15" to provide a spiral slit. In FIGURE 8 the knife 22''' is integral with and angularly related to its arm 15''' to provide a close spiral slit. The spring arms shown in FIGURES 6, 7 and 8 may be secured to the body 11 by the rivets 17.

The modified form of tool 10a shown in FIGURE 9 differs from the forms described merely in that its spring arms 15a are integral with its tubular body 11a. Their free ends 18a are available to carry the positionally selective cutter means 20 or may be integral with the knives.

Within practical limits any number of spring arms may be provided. Five of such arms have been found satisfactory and are shown in FIGURE 2 of the drawing.

In the use of the tool, assuming a right-handed individual, the body 11 is grasped with the left hand and the sausage is pushed into the entrance end of the body, that is to say the end at the right, FIGURE 1 being considered, the pushing being continued to the extent possible whereupon the body 11 is held by the right hand and the left hand is used to pull the sausage from the body 11, the knives forming the slits as above explained. Where the knives are arranged to form spiral slits they will, of course, cause the rotation of the sausage about its axis and in pushing the sausage into and pulling it from the body 11 the grasp of the fingers of the hand should be sufficiently light to permit the required turning movement of the sausage.

I claim:

1. A hand tool for slitting sausages of different diameters and lengths comprising, in combination, an open-ended tubular body of a diameter freely to receive a sausage and to permit its movement in an axial direction, one end of the body being an entrance end and being available for the introduction of the sausage and the other end being a discharge end and being available for the removal of the sausage, and a plurality of spaced radially disposed flat leaf spring arms, each having one end portion rigidly secured to and within the body adjacent its entrance end, the spring arms terminating within the body and extending inward and downward in parallel relation from their secured ends whereby their free end portions act in cooperation resiliently to receive and center the sausage as manually moved in an axial direction through the body, the arms severally being provided adjacent their free ends with inwardly projecting knives, each having an inclined cutting edge whereby it operates with a shearing action to slit the skin of the sausage and penetrate the meat to a predetermined extent, the knives acting conjointly to form a plurality of parallel slits in the sausage during its movement through the body.

2. A tool as set forth in claim 1 wherein a plate is pivotally mounted upon the free end portion of each arm and projects forward from the arm, and the inwardly projecting knife is carried by the plate, the plate being selectively positionable about its pivot to enable the knife to extend in parallel relation to the arm or in angular relation to the arm.

3. A hand tool as set forth in claim 1 wherein the knife is integral with the free end portion of the arm.

4. A hand tool as set forth in claim 3 wherein the knife extends in parallel relation to the arm.

5. A hand tool as set forth in claim 3 wherein the knife extends in angular relation to the arm.

References Cited in the file of this patent

UNITED STATES PATENTS

| | | |
|---|---|---|
| 870,919 | Wilkinson | Nov. 12, 1907 |
| 2,521,115 | Calkins | Sept. 5, 1950 |
| 2,552,046 | Justice | May 8, 1951 |
| 2,675,580 | Pesce | Apr. 20, 1954 |
| 2,702,404 | Rufenach | Feb. 22, 1955 |